United States Patent
Yudanov

(10) Patent No.: US 9,382,886 B2
(45) Date of Patent: Jul. 5, 2016

(54) FUEL SYSTEM AND CORRESPONDING METHOD

(75) Inventor: Sergi Yudanov, Västra Frölunda (SE)

(73) Assignee: Volvo Lastvagnar AB, Göteborg (SE)

(*) Notice: Subject to any disclaimer, the term of this patent is extended or adjusted under 35 U.S.C. 154(b) by 163 days.

(21) Appl. No.: 14/367,998

(22) PCT Filed: Feb. 7, 2012

(86) PCT No.: PCT/EP2012/000544
§ 371 (c)(1),
(2), (4) Date: Jun. 23, 2014

(87) PCT Pub. No.: WO2013/117200
PCT Pub. Date: Aug. 15, 2013

(65) Prior Publication Data
US 2015/0013642 A1    Jan. 15, 2015

(51) Int. Cl.
*F02M 69/54*     (2006.01)
*F02M 55/02*     (2006.01)
(Continued)

(52) U.S. Cl.
CPC ......... *F02M 55/025* (2013.01); *F02M 21/0212* (2013.01); *F02M 21/0245* (2013.01); *F02M 51/04* (2013.01); *F02M 63/0052* (2013.01); *F02M 63/0054* (2013.01); *F02M 63/026* (2013.01); *F02M 69/465* (2013.01); *F02M 63/025* (2013.01); *F02M 63/0245* (2013.01); *Y02T 10/32* (2013.01)

(58) Field of Classification Search
CPC . F02M 55/025; F02M 51/04; F02M 21/0245; F02M 21/0212; F02M 63/0054; F02M 63/0052; F02M 63/0245; F02M 63/026; F02M 63/025; F02M 69/54; F02M 69/465; Y02T 10/32
USPC ................. 123/447, 456, 457, 510, 511
See application file for complete search history.

(56) References Cited

U.S. PATENT DOCUMENTS

| 5,421,306 A | 6/1995 | Talaski |
| 5,603,302 A | 2/1997 | Minagawa et al. |
| 7,891,338 B2 * | 2/2011 | Ricco .......... F02D 41/3863 123/446 |

(Continued)

FOREIGN PATENT DOCUMENTS

DE    24 15 298 A1    10/1975

OTHER PUBLICATIONS

International Search Report (Nov. 30, 2012) for corresponding Internaional App.PCT/EP2012/000010.
International Preliminary Report on Patentability (Apr. 17, 2014) for corresponding International App.PCT/EP2012/000010.

*Primary Examiner* — Hai Huynh
(74) *Attorney, Agent, or Firm* — WRB-IP LLP

(57) ABSTRACT

A fuel injection system for supplying pressurized fuel to an internal combustion engine is provided. The fuel injection system includes a low-pressure hydraulic circuit, a fuel pump with a pumping element and an outlet valve for supply of pressurized fuel to a common rail, and an injector for delivering fuel for combustion from the common rail to the engine, wherein the fuel injection system further includes an isolating valve connected between the outlet valve of the fuel pump and the common rail, wherein the isolating valve is adapted such that the frequency of its seats making the mechanical contact with each other is lower compared to the frequency of the operation of the outlet valve of the fuel pump.

10 Claims, 2 Drawing Sheets

(51) Int. Cl.
*F02M 63/00* (2006.01)
*F02M 69/46* (2006.01)
*F02M 21/02* (2006.01)
*F02M 51/04* (2006.01)
*F02M 63/02* (2006.01)

(56) References Cited

U.S. PATENT DOCUMENTS 9,169,815 B2 * 10/2015 Akita .................. F02M 55/002
2001/0032675 A1 10/2001 Russell
2011/0114064 A1 5/2011 Akita et al.

* cited by examiner

FUEL SYSTEM AND CORRESPONDING METHOD

BACKGROUND AND SUMMARY

This invention relates to a fuel injection system for supplying pressurised fuel, in particular dimethyl ether (DME) or a blend thereof, to an internal combustion engine.

High-volatility fuels, such as DME, can present difficulties in the fast-acting systems that operate in a cyclic manner and at relatively high pressures, which is typical of ICE fuel injection systems, in regards of hydraulic tightness of system's elements. Such fuels evaporate at already quite low temperatures and lower pressures, making it difficult to prevent leakage since systems' valves have to effectively be gas-tight; this is combined with the requirement of reliable and durable operation of these same valves at high hydraulic pressure and flow, the latter often meaning large acting forces and contact pressures in the valve seats.

Failure to ensure a gas-tight seal in the valves of fuel injection systems leads to both external and internal leakages in the systems. External leakage usually appears at the injector nozzles and also in the dynamic seals of fuel pumps, although special means are known to effectively prevent these. Internal leakage is usually not as important to control as long as it is relatively small. However, in certain conditions even a small internal leakage may cause a loss of important functionality of the engine.

One such condition of the engine is a relatively long turned-off state following its operation at a relatively high temperature. The failure mode may be experienced in the form of comparatively long cranking time required for the engine to begin firing and start. The reason for the long cranking time there would be the fact that the intermediate volume between the high-pressure pump and the injector is partly or completely empty of liquid fuel and is instead filled with fuel vapour, so that the high-pressure pump needs to first re-fill that volume with liquid fuel before the pressure can rise well above the saturated vapour pressure at the given temperature to enable fuel injection. Generally speaking, the bigger is the intermediate volume, the longer it would take the pump to replenish it, so the so-called common rail fuel injection systems are particularly vulnerable in this respect on account of having to have the significant volume of the common rail placed between the high-pressure pump and the injectors. Since majority of low-viscosity fuel injection systems for diesel ermines are of the common rail type, we will hereinafter call the intermediate volume the common rail volume, or simply common rail.

Root cause of the common rail being devoid of liquid fuel in the particular conditions described above, can be internal fuel leakage out of the common rail either through injectors, through the high-pressure relief valve that is typically employed in such systems for safety and other reasons, or back through the high-pressure pump into the low-pressure part of the fuel injection system. There could also be other components hydraulically connected to the common rail, which may also contribute to such leakage. The leakage itself is driven by the higher fuel vapour pressure in the common rail and other parts of the fuel injection system installed close to engine, compared to the vapour pressure in the low-pressure part of the fuel injection system. Such vapour pressure difference is due to the difference in fuel temperatures, occurring, naturally as the warm engine keeps heating up the fuel close to it while the fuel tanks remain relatively cold. In such circumstances, even a minor leakage rate would be sufficient to displace much of the fuel out of the common rail, because a stopped hot engine will keep heating up its fuel for a long time.

The problem of vapour cavities in the common rail at the time of engine start is well known, and there are known ways of dealing with it. In some installations, a purge valve is used to allow re-tilling of the common rail with liquid fuel at a low pressure created by the low-pressure fuel feed system, before engine starting is attempted. Such a system is for example disclosed in U.S. Pat. No. 6,024,064. A disadvantage of that approach is at least two-fold: firstly, there must be a time delay allowed from the time there is a need to start the engine and the time the engine can actually be started, in order to let the low-pressure system's pump to purge the system; secondly, the purge valve has to be a high pressure-capable valve as it is connected to the common rail, thus such a valve would carry cost, reliability and other penalties. In other installations, electrically driven fuel feed systems with relatively high pressure are utilised, to be able to push the fuel through the still stationary high-pressure pump into the common rail and liquefy fuel vapour in it before actually beginning to crank the engine. These systems have similar disadvantages of needing a certain time for preparation for the actual engine start, and of being more expensive and complicated due to the need of developing higher feed pressure.

There is thus a need for an improved fuel injection system removing the abovementioned disadvantages.

The invention concerns a fuel injection system for supplying pressurised fuel, in particular dimethyl ether (DME) or a blend thereof, to an internal combustion engine, and comprises a low-pressure hydraulic circuit, a high-pressure fuel pump with an outlet valve for supply of pressurised fuel to a common rail, an injector for delivering fuel for combustion from the common rail to the engine. Opening and closing of the outlet valve is arranged to occur with a first frequency.

The invention is characterised in that said fuel injection system further comprises an isolating valve connected between the outlet valve of the fuel pump and the common rail, wherein said isolating valve is arranged to open and dose with a second frequency that is lower than said first frequency.

As described in the previous section, an ordinary check valve between the high-pressure pump and the common rail, such as one similar to an outlet valve of the pump, would not reliably carry out the function of sealing against fuel vapour escape back from the common rail. In the inventive fuel injection system, the use of an isolating valve whose operational frequency is lower compared to the operational frequency of the outlet valve of said pump, makes it possible to optimise its seat for gas-tight sealing, because it does not need to be designed for sealing high pressure nor for high-frequency operation.

According to one embodiment the second frequency is a low frequency having a magnitude similar to the frequency of appearance of demand for the common rail pressure to be raised to or maintained at a level typical for operation of the internal combustion engine, and where said first frequency is a relatively high frequency baying a magnitude similar to the frequency of the pumping strokes of at least one pumping element of the fuel pump.

The maximum differential pressures that the isolating valve has to be designed to seal against, may typically be only up to and slightly above the maximum fuel vapour pressure that can occur in use. In the case of DME, this would typically be around 60 bar. Also, according to the invention, the isolating valve is designed in such a way that during engine operation it is open, and it begins to close automatically in the absence of either high fuel pressure and/or fuel flow from the pump to the common rail when the engine is stopped or otherwise when the common rail pressure is commanded to be lowered. Thus, the seat of the valve does not need to be designed to resist significant fatigue and impact loading, and can therefore be made of a relatively soft material for a reliable gas-tight seal.

It is desirable to provide a solution to the problem of the prior art systems in a simple and inexpensive way, at the same time ensuring good reliability and durability. According to an aspect of the invention, a simple and automatically functioning isolating valve as described above that prevents the problem of emptying the common rail of fuel is provided, rather than trying to resolve the problem each time the engine needs to be started by means of utilising a relatively complex and expensive high-pressure and electrically-actuated purge valve, as in prior art systems. Preferably, the isolating valve is designed to react to flow conditions, readily opening with the flow from the high-pressure pump towards the common rail and slowly closing under the action of a return spring upon cessation of said flow or when the flow is reversed. This preferred embodiment does not need a reference to a third pressure source, but it is also possible to design the isolating valve in the form of a pressure-actuated valve, that would be open by the high pressure in the line between the high-pressure pump and the common rail, and closed by a return spring and a reference line pressure, such as the pressure in the low-pressure hydraulic circuit or ambient pressure. The opening pressure of said valve can be chosen to be well above the maximum fuel vapour pressure that can occur in use, and at the same time to be well below a minimum working pressure of a running engine. By these means, the cost of the system is kept relatively low, while the design and the automatic function of the isolating valve simplify the fuel injection system as a whole.

In a further embodiment according to the invention said isolating valve is a one-way valve connected by its outlet to the common rail and adapted to have its closing action slower than its opening action.

In another embodiment of the invention the maximum volumetric displacement of the stroke of a moving part of said isolating valve is bigger than a reverse flow from the common rail to the fuel pump, said reverse flow being measured between two consecutive forward flow pulses.

In a further embodiment according to the invention said isolating valve is a pressure-actuated valve and is adapted to be closed when the outlet pressure of said fuel pump is below a minimum normal common rail pressure of an operating engine, and is open in other conditions.

In another embodiment of the invention said isolating valve is electrically operated.

In a further embodiment according to the invention said isolating valve comprising valve seats where the closing and opening of said isolating valve is provided by said seats alternatively being in mechanical contact and non-contact with each other.

In another embodiment of the invention at least one seat of said isolating valve is made of a relatively resilient and non-metallic material.

In a further embodiment according to the invention a high-pressure relief valve is connected by its inlet to the outlet of the fuel pump.

In another embodiment of the invention a high-pressure relief valve is connected to the common rail, wherein a pressure-isolating valve is installed downstream of said pressure relief valve.

In a further embodiment according to the invention a pressure-isolating valve is connected between said common rail and said injector, wherein said pressure-isolating valve is able to open or close the hydraulic connection between the common rail and the injector depending on the pressure in the common rail.

Further advantages are achieved by implementing one or several of the features of the dependent claims.

BRIEF DESCRIPTION OF DRAWINGS

In the detailed description of the invention given below reference is made to the following figures, in which.

DETAILED DESCRIPTION

Various aspects of the invention will hereinafter be described in conjunction with the appended drawings provided to illustrate and not to limit the invention, wherein like designations denote like elements.

Figure 1:
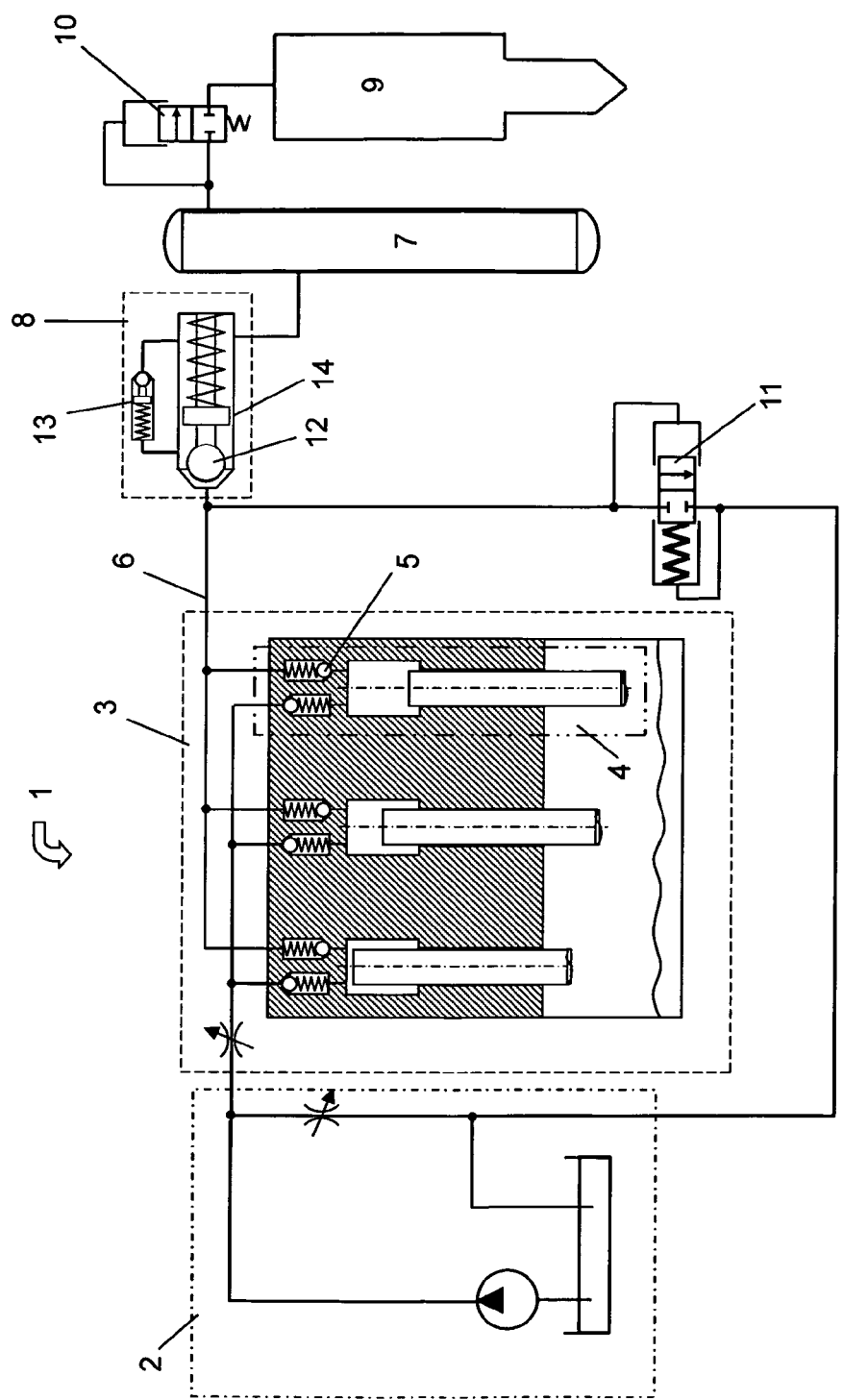
FIG. 1 shows an embodiment of the fuel injection system according to the present invention.

FIG. 1 shows a preferred embodiment of the fuel injection system 1 according to the Invention. The fuel injection system 1 is particularly suitable for supplying pressurised high-volatility fuel, such as dimethyl ether (DME) or a blend thereof, to an internal combustion engine, but the fuel injection system I is equally suitable fur conventional fuel, such as diesel oil. The fuel injection system 1 comprises a low-pressure circuit 2, which has necessary elements (not shown) for storing, filtering and supplying fuel at a relatively low feed pressure up to a fuel pump 3. Fuel pump 3 has at least one pumping element 4 that pumps up the fuel pressure from the feed pressure level up to a relatively high pressure, typically by a reciprocating motion of the pumping element 4. An outlet valve 5 is installed in conjunction with the pumping element 4 in order to prevent the fuel that is pumped out by the element 4 from flowing hack from the outlet 6 of the fuel pump into the pumping element 4. Fuel pump 3 is connected by its outlet 6 to a common rail 7 via an isolating valve 8, that is designed to operate at a significantly lower frequency than the outlet valve 5, such that it is typically kept open during the times when the engine is running but closes when the engine is stopped or when the demand for the fuel flow from the fuel pump 3 to the common rail 7 is not present.

A fuel injector 9 is connected to the common rail 7 to receive the pressurised fuel that is stored in the common rail, for injection into the engine not shown). A pressure-isolating valve 10 is installed between the common rail and the injector. The pressure-isolating valve 10 is typically designed to be open during operation of the engine and be closed gas-tight when the engine is stopped, in order to prevent possible leakage of fuel from the pressure source (common rail 7) via a closed injector into the combustion chamber of the engine. This kind of pressure-isolating valve is well known in the art and is essentially a soft-seated pressure relief valve referenced either to the ambient or to the low-pressure circuit 2.

A high-pressure relief valve 11 is also connected to the outlet 6 of the fuel pump 3, in order to protect the high-pressure elements of the fuel injection system from possible overpressure.

The isolating valve 8 can be designed in many ways that are known in the art to ensure its sufficiently quick opening in order to not create unnecessary hydraulic resistance to the forward fuel flow from the fuel pump 3 to the common rail 7, and at the same time achieve its relatively slow automatic closing upon cessation of the forward fuel flow and/or the appearance of a reverse flow. For example, the moving part 12 of the valve may be hydraulically dampened, and a one-way valve or a one-way restrictor 13 may also be used in by-pass of the dampening feature 14 as shown in FIG. 1 to reduce the valve's closing velocity compared to its opening velocity at similar forward or reverse flow conditions. However, as the forward flow from the fuel pump 3 to the common rail 7 in such fuel injection systems is normally greater than the reverse flow (the reverse flow being effectively and necessarily limited by the relatively fast-acting outlet valve 5 of the fuel pump 3), it is also possible to construct the isolating valve 8 in an even simpler way, wherein the one-way by-pass restrictor or valve is not utilised but the displacement of the moving part 12 of the valve is made sufficiently big to accommodate possible momentary reverse flow from the common rail 7 back to the fuel pump 3 without the moving part bringing the valve seats into mechanical contact and thereby closing the valve. Another possible embodiment of the isolating valve 8 is similar in the design and function to the automatic pressure-isolating valve 10 as used between the common rail 9 and the injector 9. In such an embodiment, isolating valve 8 would be designed as a pressure-relief valve referenced either to the ambient, or the low-pressure circuit, or any other medium with sufficiently low pressure to allow the valve to be open at normal operating pressures of the common rail and the engine, such that the valve would also be closed by its return spring and whatever reference pressure it is exposed to, when the engine is stopped.

Designing the isolating valve 8 in the way described, such that the frequency of its operation is significantly lower than that of, for example, the outlet valve 5, and also the fact that valve 8 is not required to effect a hydraulic seal at normal operating fuel pressures of the engine, allows to significantly shift the design focus from trying to achieve a long fatigue life of the valve seats and their resistance to high impact forces and contact pressures, onto the objective of providing a gas-tight seal in a light-duty operation. Correspondingly, in the present inventive fuel injection system, the isolating valve 8 may be designed to have a soft and/or resilient seat made of a material other than metal, such as an elastomer or a plastic with relatively good compression strength. Such a soft-seated valve would routinely achieve a gas-tight seal at relatively low cost and in a relatively simple construction. This, in turn, would achieve the objective of keeping the fuel in the common rail from being driven back through the fuel pump by the higher vapour pressure against a lower vapour pressure in the low-pressure circuit when a warm engine is not running but is still warm enough to keep the fuel in the common rail and other volumes closely associated with the common rail at a higher temperature than the fuel in the low-pressure circuit (comprising a fuel tank).

Figure 2:
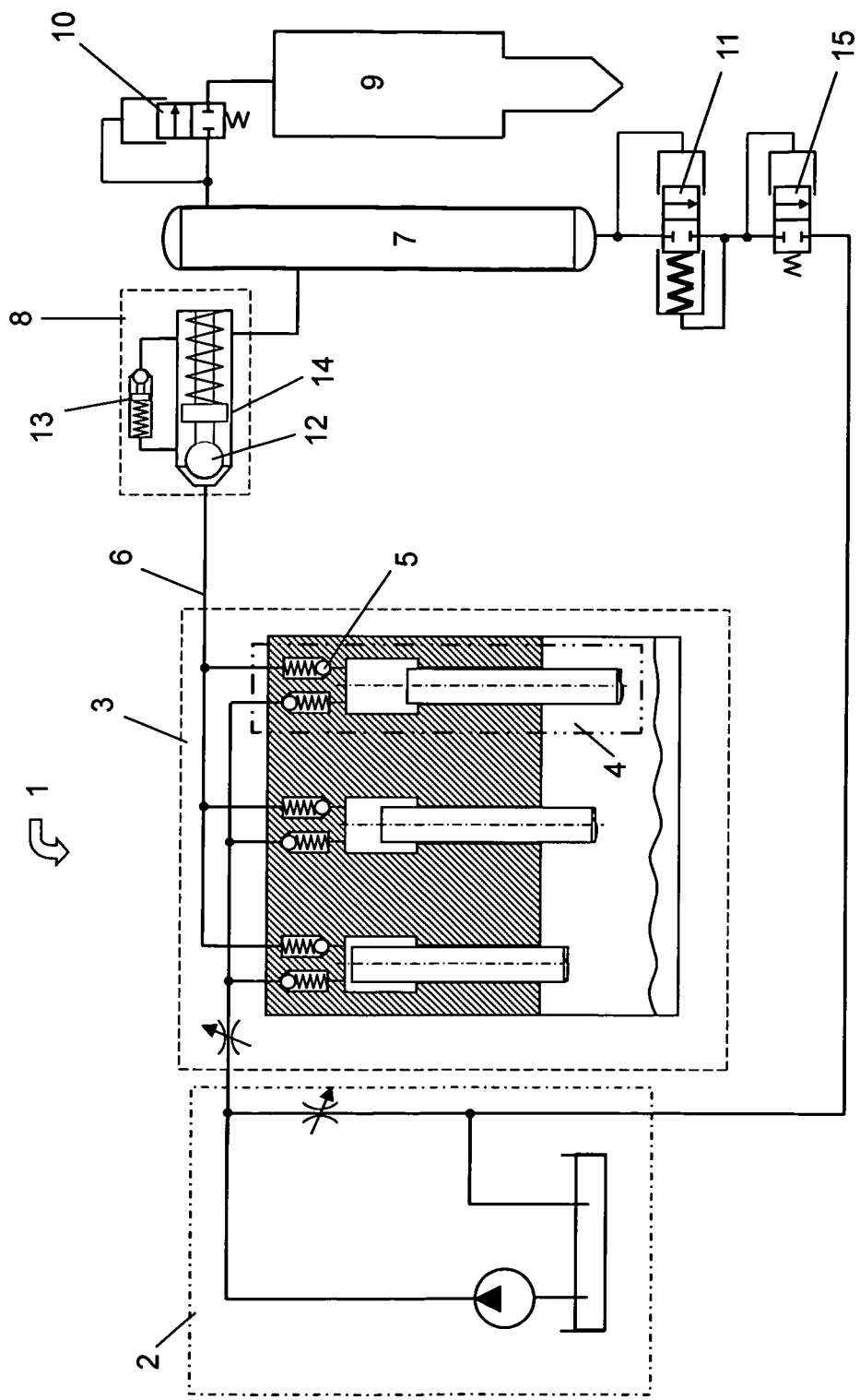
FIG. 2 shows another embodiment of the fuel injection system according to the present invention.

FIG. 2 shows schematically a second embodiment of the present invention that is very similar to the first embodiment, differing only in that the high-pressure relief valve 11 is connected to the downstream side of the isolating valve 8 and directly to the common rail 7. This embodiment gives the fuel injection system 1 the functionality of being able to dump pressure from the common rail even if the isolating valve 8 is closed, as may be required for quick common rail pressure reduction on a running engine (in which case the high-pressure relief valve may be of an electrically actuated kind), and also during service when any residual pressure has to be removed from the common rail and the volumes directly associated with the common rail. Such a high-pressure relief valve may be difficult to design for achieving a gas-tight seal due to that it has to seal high pressure and at the same time may experience frequent opening/closing action due to chatter induced by hydraulic pulsations, as well as having to have a relatively large maximum flow area and thus higher forces/contact pressures in its seats. To prevent fuel vapour escape from the common rail in a non-running state of the warm engine, in this second embodiment a pressure-isolating valve 15 is installed downstream of the high-pressure relief valve 11, The pressure-isolating valve 15 would typically be of the same kind as the valve 10 described above.

Variations of the fuel injection system according to the invention, as illustrated by the different embodiments, should not be interpreted as limited exactly to a given embodiment, but said variations may be applied to other embodiments as well when not inconsistent with each other.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims.

Accordingly, the drawings and the description thereto are to be regarded as illustrative in nature, and not restrictive. For example, several injectors can be utilised to feed a multi-cylinder engine, all connected to same common rail via their respective pressure-isolating valves. Also, an injector can have a return line for passing its internal leakage out to the low-pressure circuit, and a pressure-isolating valve may also be installed in the return line for protecting the injector from leakage into the engine that could be driven by the vapour pressure in the low-pressure circuit when the engine is not running. To prevent excessive corrosion of the nozzle of the fuel injector, the outer surface of the nozzle that can have contact with the gases present in the combustion chamber of the engine, may be painted by a high temperature-resistant paint.

The invention claimed is:

1. A fuel injection system for supplying pressurised fuel to an internal combustion engine, the fuel injection system comprising a low-pressure hydraulic circuit, a fuel pump with a pumping element and an outlet valve for supply of pressurised fuel to a common rail, an injector for delivering fuel for combustion from the common rail to the internal combustion engine, wherein opening and closing of the outlet valve is arranged to occur with a first frequency, and wherein the low-pressure circuit (2) is arranged for pumping up the fuel pressure from the feed pressure level up to a relatively high pressure wherein the fuel injection system further comprising an isolating valve connected between the outlet valve of the fuel pump and the common rail, wherein said isolating valve (8) is connected by its outlet to the common rail (7), wherein the isolating valve is a one-way valve and adapted to have its closing action slower than its opening action, and wherein the isolating valve is arranged to open and close with a second frequency that is lower than the first frequency.

2. A fuel injection system according to claim 1, wherein the second frequency is as low frequency having a magnitude similar to the frequency of appearance of demand for the common rail pressure to be raised to or maintained at a level typical for the operation of the internal combustion engine, and where the first frequency is a relatively high frequency having a magnitude similar to the frequency of the pumping strokes of at least one pumping element of the fuel pump.

3. A fuel injection system according to claim 1, wherein the maximum volumetric displacement of the stroke of a moving part of the isolating valve is bigger than a reverse flow from the common rail to the fuel pump, the reverse flow being measured between two consecutive forward flow pulses.

4. A fuel injection system according to claim 1, wherein the isolating valve is a pressure-actuated valve and is adapted to be closed when the outlet pressure of the fuel pump is below a minimum normal common rail pressure of an operating engine, and is open in other conditions.

5. A fuel injection system according to claim 1, wherein the isolating valve is electrically operated.

6. A fuel injection system according to claim 1, wherein the isolating valve comprising valve seats where the closing and opening of the isolating valve is provided by the seats alternatively being in mechanical contact and non-contact with each other.

7. A fuel injection system according to claim 6, wherein at least one seat of the isolating valve is made of a relatively resilient and non-metallic material.

8. A fuel injection system according to claim 1, wherein a high-pressure relief valve (11) is connected by its inlet to an outlet of the fuel pump.

9. A fuel injection system according to claim 1, wherein a high-pressure relief valve (1) is connected to the common rail, wherein a pressure-isolating valve (15) is installed downstream of the pressure relief valve (11).

10. A fuel injection system according to claim 1, wherein a pressure-isolating valve (10) is connected between the common rail and the injector, wherein the pressure-isolating valve (10) is able to open or close the hydraulic connection between the common rail and the injector (9) depending on the pressure in the common rail.

* * * * *